July 4, 1950  C. C. FENSTERMACHER  2,513,854
BRAKE-ACTUATING TRAILER HITCH
Filed Oct. 15, 1948  2 Sheets-Sheet 1
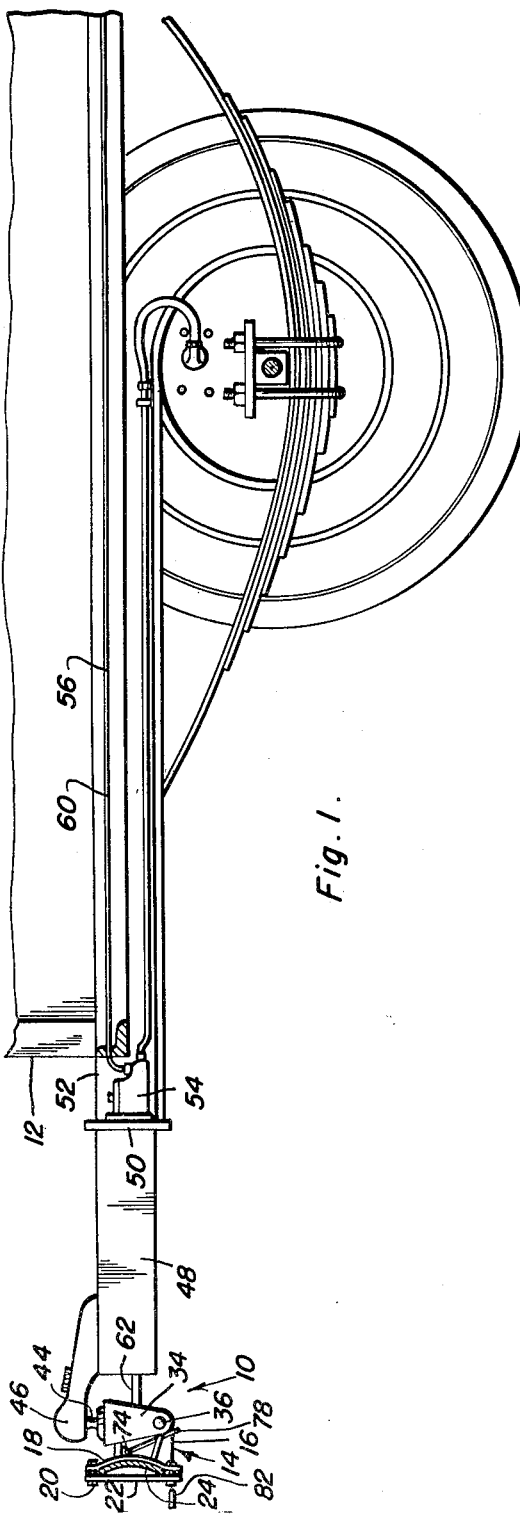
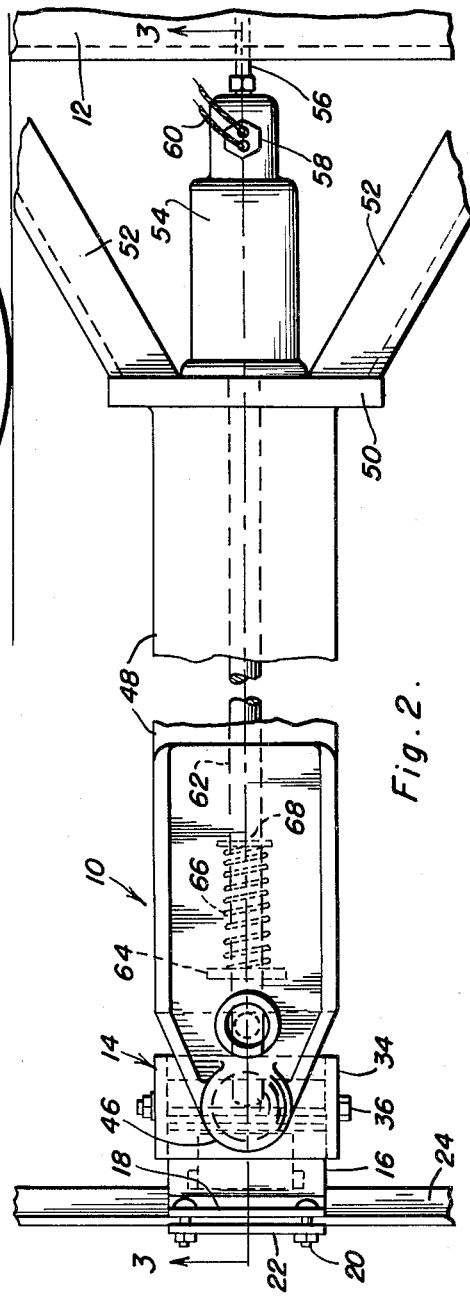
Cleo C. Fenstermacher
INVENTOR.

July 4, 1950     C. C. FENSTERMACHER     2,513,854
BRAKE-ACTUATING TRAILER HITCH
Filed Oct. 15, 1948     2 Sheets-Sheet 2
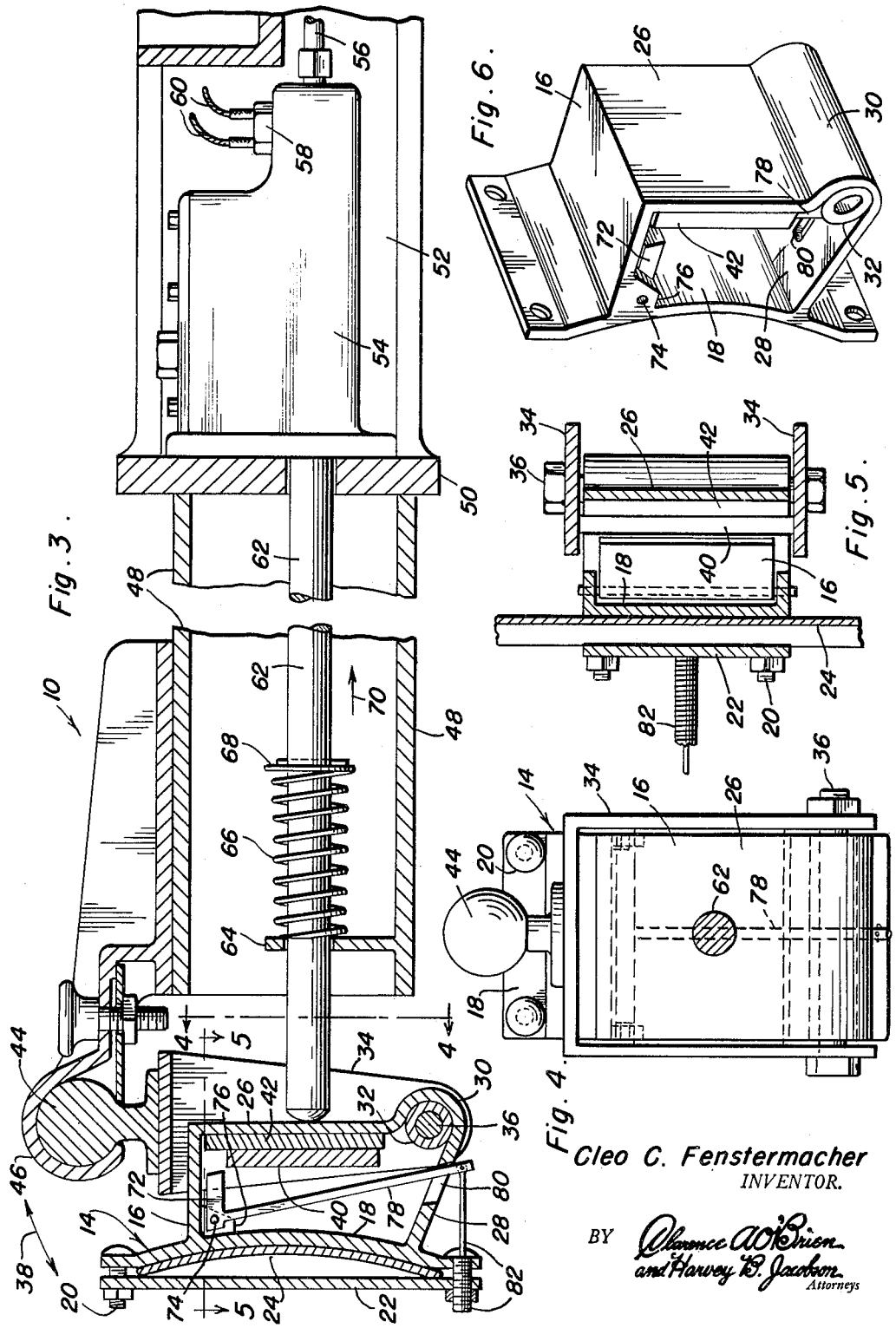
Cleo C. Fenstermacher
INVENTOR.

UNITED STATES PATENT OFFICE 2,513,854

BRAKE ACTUATING TRAILER HITCH

Cleo C. Fenstermacher, Bloomington, Calif.

Application October 15, 1948, Serial No. 54,643

1 Claim. (Cl. 188—112)

This invention relates to new and useful improvements and structural refinements in hitches for trailers, more particularly, hydraulic brake equipped trailers, and the principal object of the invention is to automatically cause the trailer brakes to be applied when the trailer attains a speed greater than the speed of the vehicle by which it is drawn, hereinafter referred to as the prime mover.

This object is achieved by the provision of the instant hitch which embodies in its construction a draft member secured to the prime mover and a draw bar provided on the trailer and connectable to the draft member, the draw bar being equipped with a hydraulic master cylinder operatively connected to the brake system of the trailer, an important feature of the invention residing in the provision of means for facilitating forward movement of the draw bar with respect to the draft member and further means for utilizing that forward movement to actuate the master cylinder so that the trailer brakes are automatically applied when the trailer is travelling at a faster rate than its prime mover.

Another feature of the invention resides in the provision of means for locking, so to speak, the draw bar with respect to the draft member so as to prevent relative movement of the two, thus facilitating rearward movement of the prime mover and trailer without the trailer brakes being applied.

A further feature of the invention involves the provision of means for remotely controlling the locking means referred to in the preceding paragraph, such as for example, from the operator's seat of the prime mover.

Important advantages of the invention reside in its simplicity of construction and operation and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a fragmentary side elevational view of a trailer with the near wheel thereof removed, the trailer being shown as coupled to its prime mover by a hitch constructed in accordance with the invention;

Figure 2 is a fragmentary, enlarged plan view of the device shown in Figure 1, the trailer body being broken away;

Figure 3 is a cross sectional view, taken substantially on the plane of the line 3—3 of Figure 2;

Figure 4 is a cross sectional view, taken substantially on the plane of the line 4—4 of Figure 3;

Figure 5 is a cross sectional view, taken substantially on the plane of the line 5—5 of Figure 3; and;

Figure 6 is a perspective view of a bracket used in the invention.

Like characters of reference are employed to designate like parts in the specification and throughout the several views.

Referring now to the accompanying drawings in detail, the invention consists of a trailer hitch designated generally by the reference character 10, such as may be conveniently and effectively employed for separably connecting a trailer 12 to its prime mover, the latter assuming the form of an automobile, truck or the like.

The hitch 10 embodies in its construction a draft member designated generally by the reference character 14, this preferably assuming the form of a bracket 16 which is substantially U-shaped and is secured to or formed integrally with an arcuate plate 18. The plate 18 is attached by suitable bolts 20 to a coacting plate 22 whereby the entire draft member may be rigidly secured to the rear bumper bar 24 of the prime mover, as will be clearly apparent.

It is to be noted that the bracket 16 includes a flat substantially vertical back wall 26 and a bottom wall 28, a portion of the bracket at the confluence of these two walls forming a rounded protuberance 30 in which is rigidly secured a tubular bushing 32.

A substantially U-shaped, inverted yoke 34 straddles the bracket 16 and is pivotally attached thereto by means of a pivot screw 36, matters being so arranged that the yoke 34 is swingable forwardly and rearwardly, as indicated at 38 in Figure 3.

Rearward swinging of the yoke 34 is restricted by a stop assuming the form of a cross member 40 secured between the "arms" of the yoke and adapted to engage a resilient pressure pad 42 which is suitably secured to the inner surface of the back wall 26 of the bracket 16.

The yoke 34 carries a sphere 44 of conventional design, which sphere is engageable by a complementary socket 46, also of a conventional type, secured to a draw bar 48.

The draw bar 48 is preferably of an elongated, box-like construction and is rigidly secured at one end thereof to a plate 50 which, in turn, is rigidly secured to the frame 52 of the trailer 12. A hydraulic master cylinder 54 of a conventional type is disposed between the frame members 52 and is also secured to the plate 50, this master cylinder being operatively connected by suitable lines 56 to the wheel cylinders (not shown) of the trailer hydraulic brake system. Moreover, the hydraulic cylinder may be equipped with the usual switch 58 electrically connected as at 60 to a stop light (also not shown) with which the trailer may be provided.

As will be apparent from the foregoing, by virtue of the forwardly swingable yoke 34 provided on the draft member bracket 16, forward movement of the draw bar 48 with respect to the draft member 14 is facilitated in the event when the speed of the trailer exceeds the speed of its prime mover. In view of this facility, means are provided for utilizing the relative forward movement of the draw bar with respect to the draft member for actuating the brake cylinder 54, so that the trailer brakes are applied automatically and the speed of the trailer is retarded.

These means for automatically actuating the cylinder 54 include a forwardly and rearwardly slidable rod 62 which bears against the piston (not shown) of the master cylinder 54, the forward end portion of this rod being slidable in a suitable bracket 64 provided in the draw bar 48 and the forward extremity of the rod being engageable with the rear surface of the back wall of the bracket 16. A tension spring 66 is positioned on the rod 62 between the bracket 64 and a stop washer 68 keyed to the rod, the spring 66 serving to maintain the inner end of the rod 62 in engagement with the master cylinder piston.

It will be apparent from the foregoing that when the speed of the trailer 12 exceeds the speed of its prime mover, the draw bar 48 will cause the yoke 34 to be swung forwardly on the bracket 16, and the engagement of the rod 62 with the back wall 26 of the bracket will cause the rod 62 to be slid rearwardly as indicated at 70 in Figure 3, thus actuating the master cylinder 54 and causing the trailer brakes to be applied. In this connection it is to be noted that the greater the difference between the speeds of the drawing and drawn vehicles, the greater will be the force urging the rod 62 against the wall 26 and therefore, the greater will be the force actuating the master cylinder 54 and the braking effort exerted.

Means are provided to facilitate rearward travel of the trailer and its prime mover without applying the trailer brakes, these means involving the provision of a locking catch 72 pivoted as at 74 to suitable lugs 76 provided in the bracket 16, the catch 72 being formed integrally with a lever 78 which extends downwardly and projects through an opening 80 formed in the bracket wall 28, as is best shown in Figure 4. The lever 78 is operatively connected to a Bowden cable 82 which facilitates remote control of the catch 72, such as for example, from the operator's seat of the prime mover. The catch 72 is normally disposed in the position shown in Figure 4 in which it is located above the cross member 40 of the yoke 34 and forward swinging of the yoke is facilitated. However, when the trailer and prime mover are to be "backed up" the Bowden cable 82 is actuated so as to lower the catch 72 to a position where it is engageable by the cross member 40 of the yoke 34, so that forward swinging of the yoke is not permitted and the yoke is thus locked, so to speak, in its rearwardly swung position, adjacent the pressure pad 42. By virtue of this arrangement, the trailer and prime mover may be backed up without applying the trailer brakes, as will be clearly apparent.

Finally, it is to be noted that notwithstanding the presence of the brake actuating component in the trailer hitch, the trailer may be readily and conveniently separated from the prime mover by simply disengaging the socket 46 from the ball 44 and conversely, the trailer may be connected to the prime mover with equal expediency, all this being effected without disturbing the brake actuating mechanism.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In a brake actuating trailer hitch, the combination of a draft member adapted to be secured to a prime mover and consisting of a box-shaped bracket having open sides and including a vertical back wall and a bottom wall provided with rounded contiguous edges affording a transversely elongated seat, a tubular bushing secured in said seat, a shock absorbing pad provided on the front surface of said back wall, an inverted U-shaped yoke straddling said bracket and including a transverse bight portion and a pair of depending side members disposed at the opposite open sides of the bracket, a fulcrum element extending through said bushing and through said side members whereby the yoke is swingable forwardly and rearwardly on said bracket, a cross member extending between and secured to said side members and extending through the open sides of the bracket to abut said pad when the yoke is swung rearwardly, a draw bar positioned rearwardly of said bracket and of said yoke, coacting coupling elements provided on the bight portion of the yoke and on said draw bar, and brake actuating rod slidable on the draw bar and having a forward end engageable with the rear surface of said back wall when said yoke is swung forwardly.

CLEO C. FENSTERMACHER.

REFERENCES CITED

The following references are of record in the file of this patent:

UNITED STATES PATENTS

| Number | Name | Date |
| --- | --- | --- |
| 1,824,845 | Stout | Sept. 29, 1931 |
| 2,127,912 | Graham et al. | Aug. 23, 1938 |
| 2,135,097 | Billingsley | Nov. 1, 1938 |
| 2,320,585 | Gill et al. | June 1, 1943 |
| 2,341,965 | Wagner | Feb. 15, 1944 |